US012603507B2

(12) United States Patent
Werner et al.

(10) Patent No.: US 12,603,507 B2
(45) Date of Patent: Apr. 14, 2026

(54) METHOD FOR CONTROLLING DECENTRALIZED LOADS IN AN ENERGY SYSTEM

(71) Applicant: MeteoViva GmbH, Aachen (DE)

(72) Inventors: Markus Werner, Jülich (DE); Jonas Blum, Jülich (DE); Stefan Hardt, Jülich (DE)

(73) Assignee: MeteoViva GmbH, Aachen (DE)

( * ) Notice: Subject to any disclaimer, the term of this patent is extended or adjusted under 35 U.S.C. 154(b) by 394 days.

(21) Appl. No.: 18/035,552

(22) PCT Filed: Nov. 8, 2021

(86) PCT No.: PCT/EP2021/080962
§ 371 (c)(1),
(2) Date: May 5, 2023

(87) PCT Pub. No.: WO2022/096719
PCT Pub. Date: May 12, 2022

(65) Prior Publication Data
US 2023/0307919 A1     Sep. 28, 2023

(30) Foreign Application Priority Data

Nov. 9, 2020     (EP) ..................................... 20206510

(51) Int. Cl.
*H02J 3/38*          (2006.01)
*H02J 3/00*          (2006.01)

(52) U.S. Cl.
CPC .............. *H02J 3/381* (2013.01); *H02J 3/003* (2020.01); *H02J 3/004* (2020.01)

(58) Field of Classification Search
CPC .. F24F 11/47; F24F 2140/50; H02J 13/00032; H02J 2203/20; H02J 2300/24;
(Continued)

(56) References Cited

U.S. PATENT DOCUMENTS

2011/0231320 A1* 9/2011 Irving .................... G06Q 30/08
713/300
2012/0323382 A1* 12/2012 Kamel ................... G06Q 50/06
700/286

(Continued)

FOREIGN PATENT DOCUMENTS

DE        102016225787 A1     6/2018
EP           1134508 A2      9/2001

*Primary Examiner* — Chun Cao
(74) *Attorney, Agent, or Firm* — The Webb Law Firm

(57)          ABSTRACT

A method and device for controlling decentralized loads in an energy network, including at least two controllable loads, wherein the controllable loads are in particular energy consumers and/or energy storages and/or energy producers distributed over several buildings or building complexes. The loads are connected to a central energy supply by means of an energy supply line for providing power to the loads. In doing to, at least two controllable loads are provided. In the method, an inter-building load forecast is determined for several loads. In addition, an inter-building operational plan is created for at least two controllable loads on the basis of the inter-building load forecast. The controllable loads are driven on the basis of the inter-building operational plan and by means of the climate profiles of generated control data.

9 Claims, 1 Drawing Sheet

(58) Field of Classification Search
CPC .............. H02J 2310/12; H02J 2310/60; H02J
2310/64; H02J 3/003; H02J 3/004; H02J
3/14; H02J 3/28; H02J 3/381; Y02B
90/20
USPC ........................................................ 700/291
See application file for complete search history.

(56) References Cited

U.S. PATENT DOCUMENTS

2013/0013121 A1 *    1/2013    Henze .................... G06Q 10/04
700/291
2013/0245847 A1 *    9/2013    Steven .................. G06Q 50/06
700/291
2016/0124411 A1 *    5/2016    Tinnakornsrisuphap ....................
G05B 19/0428
700/291
2016/0305678 A1 *    10/2016    Pavlovski ............. G05B 15/02

* cited by examiner

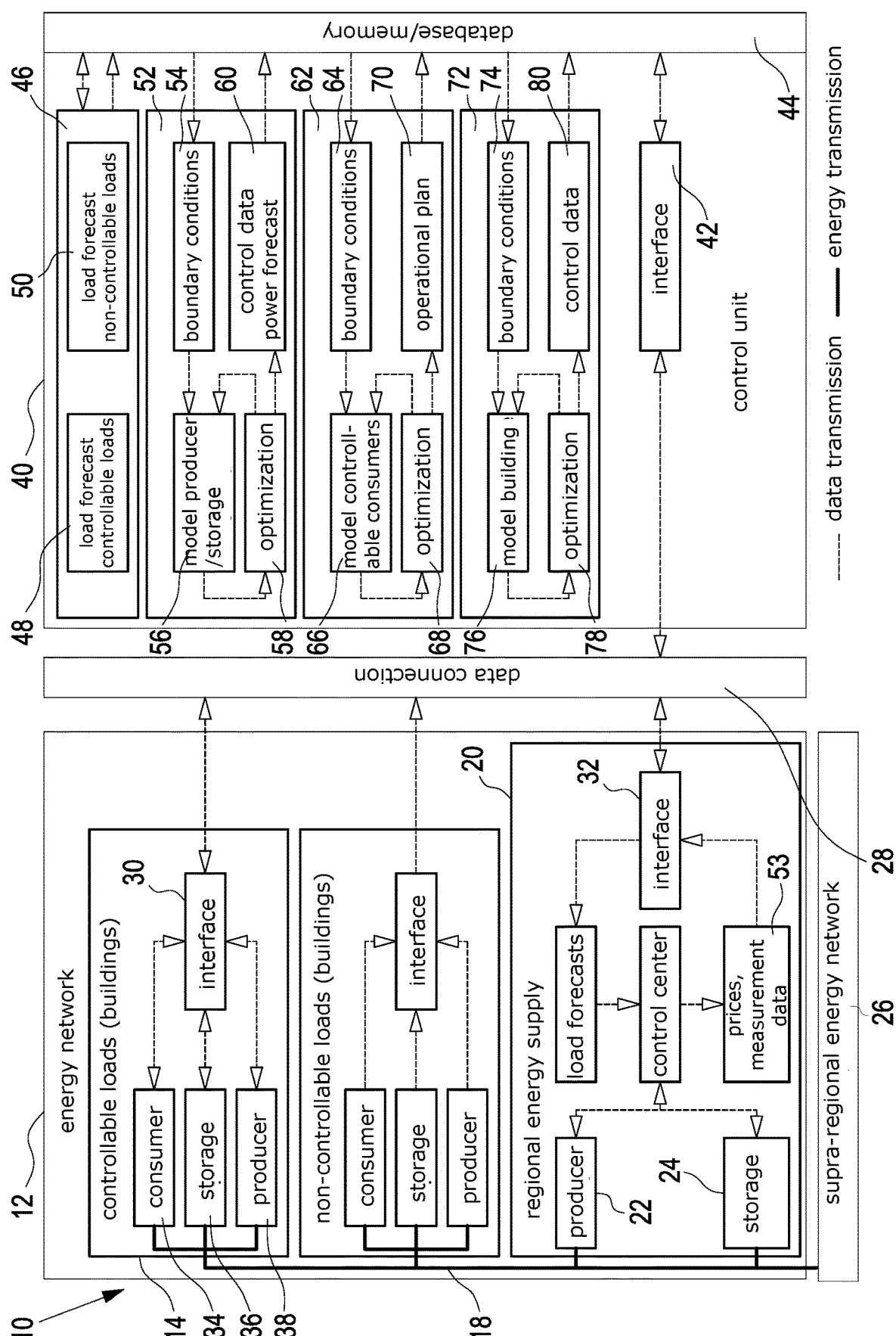

METHOD FOR CONTROLLING DECENTRALIZED LOADS IN AN ENERGY SYSTEM

CROSS-REFERENCE TO RELATED APPLICATIONS

This application is the United States national phase of International Application No. PCT/EP2021/080962 filed Nov. 8, 2021, and claims priority to European Patent Application No. 20206510.8 filed Nov. 9, 2020, the disclosures of which are hereby incorporated by reference in their entireties.

BACKGROUND OF THE INVENTION

Field of the Invention

The present invention relates to a method for controlling decentralized loads in an energy network system as well as such an energy network system.

Description of Related Art

Load is defined as one or more consumers, energy storages, and energy producers of energy inside a building or building complex. A distinction must be made between controllable and non-controllable loads.

Controllable loads are controllable consumers (e.g. HVAC systems) and/or optionally existing controllable own energy storages and/or energy producers inside a building or building complex whose load behavior can be influenced by control signals from outside the building.

Non-controllable loads are consumers (e.g. HVAC systems) and/or optionally existing controllable own energy storages and/or energy producers inside a building or building complex whose load behavior cannot be influenced from outside but can be measured.

Climate profile describes the temporal course of the lower and upper limits of permissible room conditions, expressed by the climate parameters.

Climate parameter is the desired, measurable state of the room climate, e.g. room temperature, humidity or $CO_2$ content of the room air.

Climate comfort band is the permissible band between the lower and upper limits of the climate profile within which the climate parameter should move.

Energy network is the combination of an energy supply, non-controllable and controllable loads.

Energy network system combines an energy network, a central control device and data transmission.

The operational plan specifies the distribution of the energy, in particular with the minimum required operating times as well as permissible value ranges of the distribution for controlling the controllable loads present in the energy network.

Energy price describes the price for the consumption or production of a quantity of energy content of an energy carrier.

Power price describes the price for the power to be provided by an energy supply irrespective of energy consumption.

In previous energy network systems, the existing loads are independently supplied with energy. The loads are in particular buildings or building complexes with consumers, optional storages and/or producers of energy installed therein. By means of energy supply lines, the individual loads are connected to a central energy supply for providing energy to the respective loads. The energy can be electrical and/or thermal energy, for example. The central energy supply, for example from a regional energy supplier, supplies energy individually and independently to the consumers, e.g. HVAC systems (heating, ventilation, air conditioning), in order to meet climate conditions in the individual buildings. The temporal course of a climate parameter is specified as a climate profile for each building separately and independently of one another. Usually, a lower limit and an upper limit of this climate parameter are provided, within which an appropriate comfortable climate exists in the building. For example, the climate parameter may be the temperature inside the building. The temperature has a lower limit and an upper limit within which the room temperature is perceived as comfortable.

In EP 1 134 508, a method is disclosed in which the control of the climate of an individual building or building complex can be optimized so that the lowest possible energy demand is always present to meet the desired climate profile. In this respect, EP 1 134 508 proposes the inclusion of load forecasts for the individual building, in particular with regard to the forecast development of weather variables such as outside temperature and/or solar radiation. In addition, times-of-use may be defined and reflected in the specified climate profile to be met. There is no coupling of other buildings/loads within the same energy network.

Even if several buildings optimally driven according to EP 1 134 508 are provided within an energy network, adverse effects may still occur within the energy network. For example, if several loads start simultaneously and independently from the night setback in order to achieve the climate specification for the times-of-use of the respective building, undesirable load peaks may occur in the energy network. Thus, the energy supplier must either provide sufficient basic capacity to provide the required energy for such a load peak, which involves increased costs. Or, within such a load peak, individual or all buildings cannot be sufficiently supplied with energy, so that under certain circumstances the specifications of the respective climate profile are not achieved inside these buildings.

Furthermore, it is known that energy prices can depend on times of day and are based on a forecast consumption, in particular. If increased energy consumption is forecast for a specific time, which may lead to capacity shortages in the energy network, the energy supplier may set an increased labor and/or power price for this time of day. In this case, high costs coincide with high loads, for example, for the time when buildings usually come out of the night setback.

Furthermore, DE 10 2016 225787 A1 describes a method for operating an energy management system of a building and a corresponding energy management system. The building may have an energetic load, an energy producer and an energy storage, wherein the aforementioned components can be supplied via a grid connection point. In the method described in DE 10 2016 225787 A1, it is provided that input data is received indicating a planned nominal load profile of the building at the grid connection point. In a preset time interval, a short-term power flexibility is determined as a function of the planned nominal load profile. Then, the determined short-term power flexibility is provided to other entities connected to the energy grid.

The described method optionally speaks of aggregation of several buildings to a total load. An optimization across several buildings, in which the operation of the individual building is optimized depending on the operation of other buildings within the same interconnected grid, is not the subject of the method of DE 10 2016 225787 A1.

SUMMARY OF THE INVENTION

It is an object of the present invention to provide a method for controlling decentralized loads in an energy network as well as an energy network system which optimally controls the decentralized loads such that cumulative load peaks and/or energy costs in the energy network are minimized.

The object is achieved by the method as described herein as well as the energy network system as described herein.

The invention relates to a method for controlling decentralized loads in an energy network. The energy network includes at least two loads, wherein the loads are in particular consumers and/or preferably energy producers and/or energy storages inside several buildings or building complexes. The at least two loads are connected to a central energy supply by means of an energy supply line. The central energy supply is used to provide energy to the loads, for example, for climate control inside the respective buildings or building complexes. Climate control is performed, for example, with HVAC systems (heating systems, ventilation systems and/or air conditioning systems).

The use of a control of loads across several buildings has the advantage that fluctuations in energy consumption as well as in energy production, which can occur independently in different buildings, can be taken into account in the control.

For example, if excessive energy consumption is detected in a first building, while particularly high energy generation (for example, by a photovoltaic system) is detected in a second building, this can be taken into account in the inter-building operational plan. In addition, the energy prices in effect at the current time can be taken into account, so that the buildings can always obtain their energy through the most favorable energy source at the current time or energy from external sources at the most favorable times.

This makes it possible to provide a method for controlling loads that allows particularly efficient control of individual loads, advantageously determining a load forecast across several buildings, and using an inter-building operational plan.

At least two controllable loads are provided within the energy network. Controllable loads are to be understood as buildings or building complexes with controllable consumers, optional storages and/or producers that can be influenced and changed by control signals from outside, for example by a central control unit. In particular, such controllable loads are buildings or building complexes, which for example have a control system according to EP 1 134 508.

According to the invention, the method comprises the following steps:

1. determining load forecasts for controllable and non-controllable loads;
2. creating at least one operational plan for controllable loads based on load forecasts;
3. specifying climate profiles to optimize controllable loads, provided they are used for climate control;
4. driving the controllable loads based on the operational plan and climate profiles of generated control data.

Thus, a load forecast is first created for at least two loads, so that there is knowledge about the anticipated course of the energy consumption of the respective load to be expected. Here, the load forecasts are generated based on historical consumption data of the respective loads and can also take external influences into account, such as outside temperature, solar radiation, expected usage and the like. From the knowledge of the expected energy consumption based on the determined load forecasts, an inter-building operational plan is then created for the respective loads in the buildings, which partially or completely releases or blocks the operation of the individual loads in terms of time. Taking into account the operational plan, the operation of the individual controllable loads is controlled in an optimized manner. Thus, a common, optimized and central control for all controllable loads with the energy network is given.

However, the present invention is not limited to a specific operational plan. Various operational plans are already known from the prior art and can be used within the scope of the present invention.

Thus, the individual distributed loads can be driven within the energy network, so that a mutual, detrimental influence of the individual buildings and building complexes within an energy network is just prevented.

It is ensured that the temporal course of a climate parameter to be maintained (e.g. room temperature) does not leave the permissible comfort band between the upper and lower limits of the climate profile and thus a climate perceived as comfortable is generated in the respective buildings. In particular, the entire control parameter range of the individual loads is utilized for this purpose. For example, if the climate parameter is the room temperature, then for a specific load, after initially exceeding a lower limit of the climate profile, no more or less heat is consumed or generated by the HVAC systems. At this time, no more or less energy is then required. The building fabric is utilized as an inert heat storage.

The operational plan in combination with optimized control data provides optimized, central control of the deployment of the controllable loads in an energy network system across building boundaries.

In particular, more than one controllable load is provided in the energy network. In this process, as described above, a load forecast is created for each controllable load and subsequently included in the operational plan as a controllable load. In particular by providing more than one controllable load in the energy network, it is possible to send load forecasts to the central energy supply.

Preferably, a first optimization variable is selected for creating the operational plan, wherein the optimization variable for the operational plan is maximized or minimized, respectively. It is a network-wide, common optimization variable. The first optimization variable may be, for example, the total load, in particular of the respective energy carrier within the energy network.

Alternatively or additionally, first optimization variable may be the energy costs. The operational plan is optimized such that the first optimization variable is maximized or minimized by the created operational plan. If, for example, the first optimization variable is the total load, in particular of the respective energy carrier within the energy network, or the costs for energy production or provision, the operational plan is optimized and created such that the first optimization variable is minimized to avoid load peaks within the energy network and/or unnecessary costs for energy provision.

Alternatively or additionally, the first optimization variable is an energy producer. For example, the intention may be to use as much energy as possible from renewable energy sources. Thus, the operational plan is optimized such that the first optimization variable is maximized and a maximum proportion from renewable energy is provided.

Preferably, the loads have consumers and/or energy producers and/or energy storages. In particular, multiple loads have an energy consumption and, in particular, an energy producer and/or energy storage. Preferably, all loads have an energy consumption and, in particular, an energy producer and/or an energy storage. All loads can be of the same configuration with regard to energy consumers, energy producers and energy storages. Alternatively, at least two loads are configured to be different in this respect. The energy consumer is, for example, well-known HVAC systems and also includes the construction physics of the building or building complex as a thermodynamic system. The energy producer is, for example, one or more photovoltaic systems, one or more solar thermal systems, one or more wind turbines, or the like. The energy storages are any form of energy storage such as one or more heat/cold storages or power storages, in particular batteries or capacitors.

Preferably, at least one controllable load comprises an energy producer and/or an energy storage. Then, an energy producer/energy storage forecast is determined for each energy producer and/or each energy storage. The energy producer/energy storage forecast determines the energy that is expected to be provided by the respective energy producers, either proportionally or fully. This also takes into account the use of energy storages, which can be charged and can release their energy at a later time to the consumers of the load to reduce the energy required from external and associated costs to meet the climate profile.

Here, the energy producer/energy storage forecast is determined based on historical data for the respective energy producers and/or energy consumers. Furthermore, other influences can also be taken into account, such as outside temperature, wind speed, solar radiation or the like, all of which can have an impact on energy production.

Then, energy producer/energy storage control data is determined based on the energy producer/energy storage forecast for the deployment and control of the energy producers and/or energy storages of the controllable loads.

Further, a second common, network-wide optimization variable is selected, wherein the use of the energy producer and/or the energy storage is optimized to minimize/maximize the second optimization variable. The second optimization variable may be, for example, the energy supply costs and/or the total load, in particular of the respective energy carrier within the energy network. In this respect, the use and in particular the time of use of the energy producer and/or the energy storage is optimized to minimize/maximize the second optimization variable. The second optimization variable can be selected identically to the first optimization variable. If energy producers and/or energy storages are thus provided within the energy network, the created energy producer/energy storage control data is taken into account when creating the operational plan of the respective energy consuming loads. For example, energy produced by an energy producer inside a building or building complex can be taken into account when creating the operational plan, since the energy generated by the energy producer precisely does not have to be provided by the central energy supply.

Similarly, the energy storages are taken into account, wherein the energy storages are charged at a predetermined time according to the operational plan when, for example, the total load within the energy network or the costs to provide the energy to be stored by the energy storage is low. Then, the stored energy of the energy storages can be provided according to the operational plan and thus precisely does not have to be supplied by the central energy supply.

Preferably, the climate parameters are room temperature and/or air quality. In particular, a desired temporal course of said climate parameters correlated with the time of day is specified by the climate profile, wherein the climate profile is defined as a permissible climate comfort band with an upper limit and a lower limit. Said climate comfort band defines the comfort zone with respect to the considered climate parameter.

Preferably, the energy network includes at least one or more non-controllable loads. On the one hand, these are energy consumers whose energy consumption cannot be influenced by suitable control signals from a central control unit. Nonetheless, for the non-controllable loads, energy consumption can be recorded to create the load forecasts. The same applies, on the other hand, to the energy producers and/or energy storages of the non-controllable loads, if provided. Thus, the balance energy consumption of the non-controllable loads from consumption, storage, and production can be taken into account when creating the operational plan.

Preferably, optimization of the energy demand of each controllable load is performed individually. For the optimization, a model is created for at least two controllable loads, and the optimum control data for e.g. HVAC systems of the respective controllable load is determined therefrom by using an optimization procedure. Thus, further information such as energy prices, outside temperature and/or solar radiation, wind speed or the like can be taken into account for the optimization. Further features of the optimization of the energy demand of a single controllable load result from EP 1 134 508, for example.

Preferably, the energy is one or more different energy carriers such as heat, electric power, cooling energy, or fuels such as gas or oil.

Further, the present invention relates to an energy network system, wherein the loads are in particular consumers and/or energy storages and/or energy producers of energy inside buildings or building complexes. In this respect, the loads are connected to a central control unit for receiving a measured energy consumption of the loads, wherein the control unit is configured to generate load forecasts from the received energy consumption of each load. The load can be connected to the central control unit via the Internet, for example, and in particular via a secure connection.

Furthermore, the loads are connected to a central energy supply by means of an energy supply line for providing power to the loads. At least two controllable loads are provided within the energy network system. In this context, the controllable loads are to be understood as buildings or building complexes with controllable consumers, for example controllable HVAC systems, wherein the energy consumption of the controllable loads can be influenced and changed from outside by control signals from a central control unit. In particular, such a controllable load is a building or building complex, which for example has a control system according to EP 1 134 508.

According to the invention, the control unit is further configured to create a operational plan for at least one controllable load by means of the load forecasts, which operational plan specifies the distribution of the energy, in particular with the minimum required operating times and permissible value ranges of the distribution for controlling the controllable loads present in the energy network, and thus centrally influences or controls the energy consumption of the individual controllable loads on the basis of the created load forecasts. Thus, at least one operational plan is given for at least one controllable load within the energy network based on load forecasts and/or energy prices and/or power prices. Then, the central control unit controls the energy consumption of the at least two controllable loads based on the operational plan and the climate profile of generated control data.

Furthermore, the energy network system is further formed using the features of the method described above.

BRIEF DESCRIPTION OF THE DRAWING

The depicted FIGURE shows an energy network system with a regional and local energy network in accordance with the present invention.

DESCRIPTION OF THE INVENTION

In the following, the invention is described in more detail by means of a preferred embodiment with reference to the appended FIGURE.

The FIGURE shows an energy network system 10 with a regional and local energy network 12. An energy network is a system of multiple loads or buildings that share at least one common energy source. In this respect, no geographical delimitation to a specific area or the like is required. Rather, the energy network is defined by the connection by means of common energy supply lines 18 and a common energy source, for example, by a regional energy supplier 20. Said energy network 12 includes one or several controllable loads 14.

In addition thereto, energy network 12 may include one or more non-controllable loads 16. Here, the controllable loads 14 are such loads where the energy consumption can be controlled or at least influenced from outside by a central control unit 40 via suitable control signals. In contrast, the energy consumption of non-controllable loads 16 cannot be controlled externally and results exclusively from the local automation of the respective non-controllable loads 16.

The loads 14, 16 may be, for example, consumers and/or energy producers and/or energy storages inside buildings or building complexes. In particular, energy network 12 connects a definable area, campus, or territory to an energy supplier 20 via energy supply lines 18. Energy is provided by energy supplier 20 to the controllable loads 14 and non-controllable loads 16 via power supply line 18. To this end, energy supplier 20 has its own energy producers 22 and/or energy storages 24. Alternatively or additionally, energy is provided by energy supplier 20 to the controllable loads 14 and non-controllable loads 16 from a supra-regional energy network 26.

Furthermore, energy network system 10 has a data connection 28, wherein the controllable loads 14 and non-controllable loads 16 are connected to central control unit 40 via suitable interfaces 30 through data connection 28 for exchanging data. Data connection 28 may be the Internet or the mobile network. In particular, data connection 28 is a secured data connection such as VPN. In particular, the data transmission may be effected in a wired or wireless manner.

Similarly, energy supplier 20 includes a suitable interface 32 for exchanging data using data connection 28.

In particular, the at least two controllable loads 14 each have at least one load 34. In particular, this can be a heating system, a ventilation system and/or an air conditioning system. In particular, all components of a building that consume energy in interaction with the construction physics are to be understood as consumers.

Alternatively or additionally to at least two loads 34, the controllable loads 14 may include one or more energy storages 36. This may be, for example, a heat storage based in particular on a heat storage medium such as water, salts or rocks. Alternatively, it is a storage for electrical energy such as an accumulator or a capacitor. Different storages for different forms of energy can be combined with each other within the controllable loads 14.

Alternatively or additionally to providing an energy storage 36, one or more energy producers 38 may be provided. This may be, for example, a photovoltaic system or a wind turbine for producing electrical energy. Alternatively or additionally, one or more solar thermal systems may be provided for producing thermal energy. In this respect, different producers for different forms of energy can be provided within the loads and combined with each other.

Similarly, the non-controllable loads 16 include one or more consumers 34 and, alternatively or additionally, may include one or more energy storages 36 and/or one or more energy producers 38.

By providing HVAC systems as consumers 34 within the controllable loads 14 or the non-controllable loads 16 in combination with an energy storage 36 and/or an energy producer 38, if provided, climate control is provided inside the buildings. For this purpose, climate profiles are provided, wherein a climate profile represents the specification of a climate parameter over the course of the day and, in particular, main usage and secondary usage times of the respective building. In particular, the permissible climate comfort band within which the climate parameter must be located is specified by a climate profile. Said climate comfort band is also referred to as comfort zone. For example, the climate parameter may be the room temperature. There is a lower limit for the room temperature as well as an upper limit within which the room temperature is perceived as comfortable. The climate profile defines a permissible climate comfort band with its upper limit and lower limit. Said climate comfort band defines the comfort zone with respect to the considered climate parameter.

Thus, it is not necessary to control the HVAC systems such that a specified target value must be achieved. Rather, the respective climate parameter only needs to be within the specified climate comfort band, but can move within said climate comfort band by time and level without limiting comfort. This is the reason for the flexibility of the room climate according to the invention with regard to the power consumption of the loads according to time and height.

Energy network 12 is connected to central control unit 40 via data connection 28. Energy consumptions are stored in a memory or database 44 via the interfaces 30 of the loads 14, 16 by means of data connection 28 and a suitable interface 42 of central control unit 40. Said stored, historical consumption data is used in a first module 46 to generate a load forecast of the controllable loads 48 and likewise to generate a load forecast for the non-controllable loads 50. Thus, based on the stored, historical consumption values of the loads 14, 16 within energy network 12, a forecast is generated regarding the expected temporal course of the energy consumption of the respective loads 14, 16.

In the example of the FIGURE, controllable loads 14 and/or non-controllable loads 16 are provided. The invention is not limited to two controllable loads 14. Alternatively, two further controllable loads 14 and/or further non-controllable loads 16 may be provided.

From the load forecast for the controllable loads 14 and non-controllable loads 16, the regional energy supplier 20 can use a pricing module 53 to adjust the energy price and/or power price according to the expected consumption and/or temporal course of the load profile of energy supply line 18.

Said predetermined energy price and/or power price can then be used as the basis for optimizing the energy network. Alternatively, the regional energy supplier 20 may provide for a fixed energy price and/or performance price or tie it to other conditions, such as the cost of procuring energy from the supra-regional energy network 26.

If the energy producers 38 and/or energy storages 36 are present in energy network 12, a second module 52 uses the determined load forecasts 50 of the non-controllable loads 16 and the load forecasts 48 of the controllable loads 14 to determine an optimization of the control of the energy producers 38 and/or energy storages 36 using a model 56 of the energy producers 38 and energy storages 36 to derive energy producers/energy storage control data 60 therefrom. In particular, the following can be considered as boundary conditions 54 for optimization:

energy prices
    load forecasts 48 of the controllable producers,
    load forecasts 50 of the non-controllable producers,
    load forecasts 50 of the non-controllable consumers.

For this purpose, an optimization variable is selected, wherein the use of the energy producers 38 and/or the energy storages 36 is optimized such that the optimization variable is minimized or maximized, respectively. The optimization variable is, for example, the total energy consumption within the energy network and/or the energy prices specified by the regional energy supplier 20. Thus, a power forecast 60 and energy producer/energy storage control data can be determined so that the controllable energy storages 36 and/or energy producers 38 can be optimally used within the energy network to minimize/maximize the selected optimization variable.

Of course, in this regard, the second module 52 is provided only if the energy network includes at least one power producer 38 and/or one energy storage 36. Otherwise, the second module 52 is omitted.

In a third module 62, the previously determined load forecasts 48 of the controllable loads 14 and the load forecasts 50 of the non-controllable loads 16 as well as the power forecasts of the power producers 38 and energy storages 36 are used as boundary conditions 64. Furthermore, the climate profiles of the controllable loads 14 are included as a boundary condition 64. Furthermore, an optimization variable is selected. This optimization variable may be the same optimization variable to which the use of the energy producers 38 and/or energy storages 36 was optimized. In particular, the following can be used as boundary conditions 64 for optimization:

energy prices
    climate profiles,
    load forecast of controllable producers,
    load forecast of controllable consumers,
    load forecast of non-controllable producers,
    load forecast of non-controllable consumers, Alternatively, it is an optimization variable that deviates therefrom. In particular, the optimization variable is, for example, the total load within energy network 12 or the energy procurement costs 53. Then, a model of the controllable loads 66 is used in a process to create an operational plan 70 in an optimization 68. Said operational plan 70 is optimized to maximize or minimize the optimization variable. If, for example, the optimization variable is the total load of energy network 12, operational plan 70 can be configured such that load peaks within the energy network are reduced and a minimum total load within energy network 12 is realized by means of operational plan 70.

Alternatively or additionally, the optimization variable is the energy purchase costs, which are also reduced/minimized due to optimization 68 for creating operational plan 70. The operational plan 70 determined in this process may be stored in a database 44.

In a fourth module 72, operational plan 70 is used as a boundary condition 74. In addition, the climate profiles of the individual controllable loads are taken into account. Furthermore, external variables such as outside temperature, wind force, solar radiation or the like can be taken into account as boundary conditions. Then, using a building model 76, which takes into account thermodynamic and construction-physical aspects of the respective building or building complex, and by means of an optimization method 78, control data 80 is generated for the controllable loads 14 or for their consumers 34 (e.g. HVAC systems), respectively. In particular, the following can be used as boundary conditions 74 for optimization:

energy prices
    climate profiles,
    weather data,
    internal load profiles,
    HVAC availability profiles,
    operational plan.

Thus, control data 80 is generated in the fourth module 72 for each of the controllable loads 14. Control data 80 is stored in a database/a data memory 44.

Furthermore, the control data 80 is transmitted to the controllable loads 14 via interface 42 and data connection 28 for controlling the loads 34 of the controllable loads 14 and, in particular, for driving the HVAC systems of the controllable loads 14 to control the climate conditions in the respective building.

Thus, by creating an operational plan 70, optimization is performed for a plurality of distributed loads within an energy network. Thus, the energy consumption within the energy network is controlled and optimized to an optimization variable to avoid load peaks within the energy network and/or to reduce the energy procurement costs, for example.

In doing so, the permissible climate comfort band of the respective climate profiles is utilized and the controllable loads are driven such that the optimization variable is maximized or minimized under the boundary condition that the climate parameters remain within the permissible climate comfort band of the respective climate profile. Thus, the flexibility by time and level, which is provided by the climate profiles, is utilized for an optimized control of the loads of an energy network within the individual buildings.

At the same time, the building volume/building fabric of the individual buildings is utilized as thermal/removal mass. Due to the thermal inertia of buildings and by utilizing this inertia, flexibility in the control of controllable loads and reduction of load peaks can be achieved. For example, the controllable loads within the energy network can start their warm-up phase (heating mode) or cool-down phase (cooling mode) earlier after the night setback than is required for the non-controllable loads. In this regard, operational plan 70 handles the temporal distribution of the controllable loads 14 in the energy network in terms of reducing peak load and/or energy costs and/or power costs within energy network 12.

Here, the control of controllable loads can cause the temperature to vary by level and time, but remain within the climate comfort band of the climate profile.

The warm-up phase (heating mode) or cool-down phase (cooling mode) of the controllable loads is started as far as possible with a time delay to the non-controllable loads. Due to the thermal inertia of the building of the controllable loads, the room temperature changes only slowly. Thus, if at the end of a warm-up phase the temperature was heated above the minimum temperature of the climate comfort band, at the beginning of the main usage time of the building the minimum temperature is already available without loss of comfort Thus, energy consumption within the energy network can be distributed based on the operational plan due to the increased flexibility of the buildings, and load peaks can be avoided, and/or energy costs and/or power costs within the energy network can be minimized. Alternatively or additionally, the controllable loads can be driven such that energy is consumed at a time when the energy costs are lower than at other times.

Further aspects of the invention can be summarized as follows:

1. A method for controlling decentralized loads in an energy network,
   comprising at least one load, wherein the load is in particular a consumer and/or energy storage and/or energy producer of energy inside a building or a building complex;
   wherein the at least one load is connected to a central energy supply by means of an energy supply line in order to provide energy to the load for climate control;
   wherein at least one controllable load is provided; and the method comprising the following steps:
   determining a load forecast for at least one load;
   specifying at least one climate profile for at least one controllable load, the climate profile including a predetermined climate comfort band for at least one climate parameter;
   creating at least one operational plan for at least one controllable load on the basis of the load forecast and in particular energy prices and/or power prices; and
   driving the at least one controllable load on the basis of the operational plan and by means of the climate profile of generated control data, the resulting course of the climate parameter being within the predetermined climate comfort band.

2. The method according to aspect 1, characterized in that more than one controllable load is provided.

3. The method according to aspect 1 or 2, characterized in that a first optimization variable is selected for creating the operational plan, wherein the optimization variable for the operational plan is maximized/minimized in particular on the basis of the load forecasts and/or energy prices and/or power prices.

4. The method according to any one of aspects 1 to 3, characterized in that at least one controllable load has an energy producer and/or an energy storage, wherein one or more energy producer/energy storage load forecasts are determined for one or more energy producers and/or energy storages;
   wherein a second optimization variable is selected, and wherein energy producer/energy storage control data is optimized for minimizing/maximizing the second optimization variable.

5. The method according to aspect 4, characterized in that the energy producer/energy storage forecast and in particular energy producer/energy storage control data are considered when creating the operational plan.

6. The method according to any one of aspects 1 to 5, characterized in that the climate parameters are the room temperature and/or the air quality.

7. The method according to any one of aspects 1 to 6, characterized in that the energy network includes at least one and in particular more non-controllable loads.

8. The method according to any one of aspects 1 to 7, characterized in that an optimization of the energy demand of at least one controllable load is carried out, wherein a building model for at least one controllable load is created as a calculation model for the optimization, and wherein control data for the respective controllable load are determined on the basis of the operational plan and the building model.

9. The method according to any one of aspects 1 to 8, characterized in that energy is one or more energy carriers.

10. An energy network system, comprising
    at least one load, wherein the load is in particular a consumer and/or energy storage and/or energy producer of energy inside a building or building complex;
    wherein the at least one load is connected to a central control unit for transmitting an energy consumption of the at least one load, wherein the control unit is configured to create a load forecast from the transmitted energy consumption of each load;
    wherein the at least one load is connected to a central energy supply by means of an energy supply line in order to provide energy to the load for climate control;
    wherein at least one controllable load is provided, wherein a climate profile is specified for the at least one controllable load, wherein the climate profile includes a climate comfort band for at least one climate parameter;
    wherein the control unit is further configured to create an operational plan for at least one controllable load by means of the load forecast; and
    wherein the central control unit is configured to control the energy consumption of the controllable load on the basis of the operational plan and by means of the climate profile of generated control data, the resulting course of the climate parameter being within the predetermined climate comfort band of the climate profile 11. The energy network system according to aspect 10, characterized in that the control unit is configured to perform the method according to any one of aspects 1 to 9.

The invention claimed is:

1. A method for controlling decentralized loads in an energy network,
   comprising at least two loads, wherein the loads are in particular energy consumers and/or energy storages and/or energy producers distributed over several buildings or building complexes;
   wherein the loads are connected to a central energy supply by means of an energy supply line for providing power to the loads for climate control;
   wherein several controllable loads are provided; and the method comprising the following steps:
   determining an inter-building load forecast for several loads;
   specifying climate profiles for several controllable loads, wherein the climate profiles comprise a specified climate comfort band for at least one climate parameter;
   creating at least one inter-building operational plan for several controllable loads on the basis of the inter-building load forecast and in particular on the basis of the energy prices and/or power prices; and driving the controllable loads on the basis of the inter-building operational plan and by means of the climate profiles of generated control data, the resulting course of the climate parameter being within the predetermined climate comfort band of the respective climate profile.

2. The method according to claim 1, wherein a first optimization variable is selected for creating the operational plan, wherein the optimization variable for the operational plan is maximized/minimized in particular on the basis of the load forecasts and/or energy prices and/or power prices.

3. The method according to claim 1, wherein the controllable loads comprise at least one energy producer and/or one energy storage, wherein one or more energy producer/energy storage load forecasts are determined for one or more energy producers and/or energy storages;

wherein a second optimization variable is selected, and wherein energy producer/energy storage control data is optimized for minimizing/maximizing the second optimization variable.

4. The method according to claim 3, wherein the energy producer/energy storage forecast and in particular the energy producer/energy storage control data are considered when creating the operational plan.

5. The method according to claim 1, wherein the climate parameters are the room temperature and/or the air quality.

6. The method according to claim 1, characterized in that the energy network comprises at least one and in particular more non-controllable loads.

7. The method according to claim 1, wherein an optimization of the energy demand of at least one controllable load is carried out, wherein a building model for at least one controllable load is created as a calculation model for the optimization, and wherein control data for the respective controllable load are determined on the basis of the operational plan and the building model.

8. The method according to claim 1, wherein energy is one or more energy carriers.

9. An energy network system, comprising at least two loads, wherein the loads are in particular energy consumers and/or energy storages and/or energy producers distributed over several buildings or building complexes;

wherein the loads are connected to a central control unit for transmitting control and/or measurement data to the at least two loads, wherein the control unit is configured to create an inter-building load forecast from the energy consumption of each load;

wherein the loads are connected to a central energy supply by means of an energy supply line for providing power to the loads for climate control;

wherein at least two controllable loads are provided, wherein climate profiles are specified for the at least two controllable loads, wherein the climate profiles comprise a specified climate comfort band for at least one climate parameter;

wherein the control unit is further configured to create an inter-building operational plan for controllable loads by means of the inter-building load forecasts; and wherein the central control unit is configured to control the energy consumption of the controllable loads on the basis of the inter-building operational plan and by means of climate profiles of generated control data, the resulting course of the climate parameter being within the predetermined climate comfort band of the respective climate profile.

* * * * *